(12) United States Patent
Winter et al.

(10) Patent No.: US 11,224,205 B2
(45) Date of Patent: Jan. 18, 2022

(54) POULTRY HOUSING SYSTEM CONNECTOR

(71) Applicant: Farmer Automatic GmbH & Co KG, Laer (DE)

(72) Inventors: Arno Winter, Ottenstein (DE); Henrik Frahling, Billerbeck (DE)

(73) Assignee: Farmer Automatic GmbH & Co KG, Laer (DE)

( * ) Notice: Subject to any disclaimer, the term of this patent is extended or adjusted under 35 U.S.C. 154(b) by 367 days.

(21) Appl. No.: 16/331,477

(22) PCT Filed: Aug. 25, 2017

(86) PCT No.: PCT/EP2017/071446
§ 371 (c)(1),
(2) Date: Mar. 7, 2019

(87) PCT Pub. No.: WO2018/046318
PCT Pub. Date: Mar. 15, 2018

(65) Prior Publication Data
US 2019/0216057 A1    Jul. 18, 2019

(30) Foreign Application Priority Data
Sep. 7, 2016  (GB) .................................. 1615169

(51) Int. Cl.
*A01K 31/00* (2006.01)
*A01K 31/06* (2006.01)
(Continued)

(52) U.S. Cl.
CPC ............ *A01K 31/002* (2013.01); *A01K 31/02* (2013.01); *A01K 31/06* (2013.01); *A01K 31/10* (2013.01)

(58) Field of Classification Search
CPC ...... A01K 31/002; A01K 31/02; A01K 31/06; A01K 31/10
See application file for complete search history.

(56) References Cited

U.S. PATENT DOCUMENTS 2,171,690 A  *  9/1939  Garber ................. A01K 31/002
                                                            217/47
3,896,766 A     7/1975  Martin
(Continued)

FOREIGN PATENT DOCUMENTS

CN        201884388 U      6/2011
CN        203035668 U      7/2013
(Continued)

OTHER PUBLICATIONS

European Patent Office, International Search Report for International Application No. PCT/EP2017/071446, dated Nov. 14, 2017.
(Continued)

*Primary Examiner* — Jessica B Wong

(57) ABSTRACT

A cage connector for connecting two mesh panels of a poultry cage. The connector includes two elongated members which are hingedly connected together and which are releasably fastenable to each other, so that mesh parts from each panel are connected by placing the parts between the members and fastening the members to each other. At least one member has a tab which projects transversely to the longitudinal axis of the member in the same plane, or a plane parallel to the surface of the plane of the member.

13 Claims, 5 Drawing Sheets

(51) Int. Cl.
    *A01K 31/10*     (2006.01)
    *A01K 31/02*     (2006.01)

(56) References Cited

U.S. PATENT DOCUMENTS

| | | | |
|---|---|---|---|
| 10,993,411 B2 * | 5/2021 | Link | ............. A01K 1/0017 |
| 2002/0117118 A1 | 8/2002 | Marchioio | |
| 2016/0024824 A1 * | 1/2016 | Link | ............. E05C 3/162 |
| | | | 119/481 |

FOREIGN PATENT DOCUMENTS

| | | |
|---|---|---|
| JP | H11299381 A | 11/1999 |
| JP | 2001286232 A | 10/2001 |

OTHER PUBLICATIONS

UK Intellectual Property Office, Search Report for priority Application No. GB1615169.8, dated Jan. 30, 2017.

\* cited by examiner

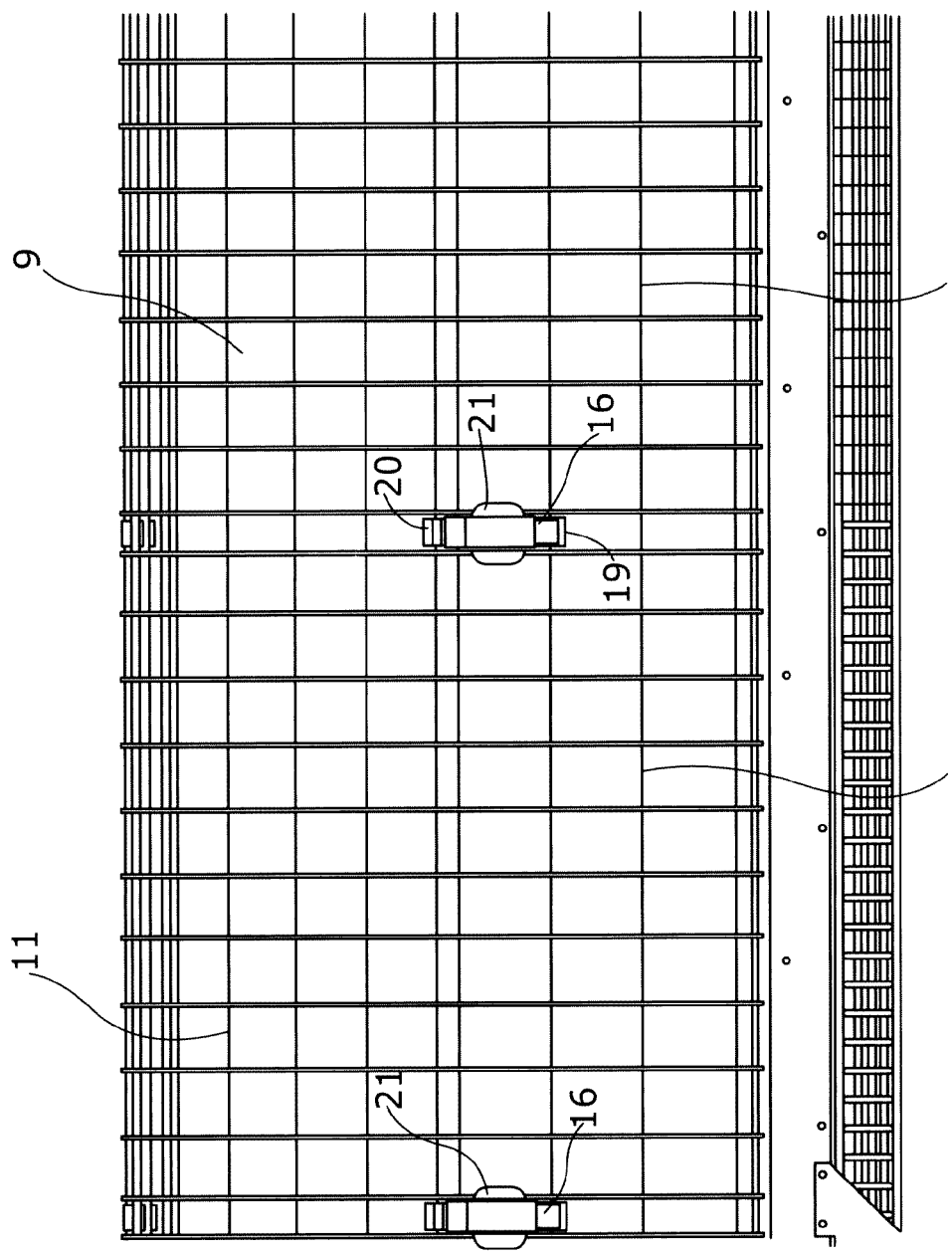

POULTRY HOUSING SYSTEM CONNECTOR

BACKGROUND OF THE INVENTION

Field of Invention

This invention relates to a housing system for poultry in which cages are arranged in a battery. More specifically, the invention relates to a device to secure the cage doors of the system.

Description of Related Art

Such housing systems are known in the art, for example those aviary layer cages old under the mark COMBI II SYSTEM" of the applicant. Such modular systems can be constructed to comprise a number of cages aligned and stacked on top of one another in tiers within a battery. Water and food can be administered to each cage from a central control system and manure from each cage drops onto a conveyor belt located beneath a mesh floor of the cage and cleared away from the cages for disposal, or further processing.

Each cage has an opening at the front of the cage which is provided with a mesh door which can be opened onto a walkway and allows the poultry to wander out of the cage when open. Ladders may be provided at the side of the cage to allow poultry located on a stacked cage to move between the walkway and the cage. The mesh door is opened and closed manually, so that when the door is closed the poultry are contained within the cage.

Each cage typically has a rectangular cuboid shape having mesh walls, a mesh roof and a mesh floor which are connected to each other and to four vertical pillars, two front pillars and two rear pillars. The opening is placed in one of the sides which is defined between two front pillars and an edge of the floor and an edge of the roof. The door typically comprises two rectangular mesh panels, an upper and a lower panel which extend across the opening between the two front vertical pillars defining the opening. One edge of the upper panel is pivotally connected to an edge of the roof. The lower panel is suspended from the upper panel by two end connectors and a number of ties between the two panels.

When the door is in a closed position, the two panels are aligned in a generally vertical plane covering most, or all of the surface area of the opening. Thus, the lower panel may or may not reach the floor of the cage. Where the panel does not reach the floor of the cage, a space is provided to enable poultry to feed from a trough in front of the lower panel. In an open position, the top panel is pivoted inwards about the connecting edge with the roof into a substantially horizontal plane and the edge of the lower panel connected to the upper panel moves inwards to also move the lower panel into a substantially horizontal plane. Poultry can then move across the opening under the folded panels. It is preferable to use two panels for the door, as described, rather than one larger panel as less space is required to open and close the door. Space within a battery is at a premium. The panels are opened by pushing a central part of one of the panels on, or close to the connection with the other panel.

The door panels are constructed without frames along the two shorter sides so that the mesh parts, that is the mesh wires are exposed and unbordered. This serves two purposes, firstly, it enables a panel end connector to be fitted to one of the horizontal wires from each panel by sliding it on to the horizontal wires. The end connector is a longitudinal part having a flat surface and is provided with two apertures to slide onto the horizontal wires. It is fitted so that the plane of the surface connector is substantially at right angles to the plane surface of the panels when the door is in both the open and closed position. Secondly, the exposed horizontal wires of the panels abut against the inside of the front pillars so that when the panels are in a closed position the door cannot be opened by poultry in the cage pushing outwards against the panels.

A different kind of tie, or connector is also required to connect the adjacent edges of the upper and lower panels to give more stability to the connection of the panels. It is typical to use a "C" shaped plastic clip having a small aperture through which adjacent wires can be threaded and which are held within the larger part of the clip. The problem with such as clip is that it allows movement of the wires within the clip which in turn allows movement of the panels which can be undesirable.

The problem with the aforementioned arrangement is that the unexposed wires of the mesh of the doors are sharp and can cause injury to both poultry and persons when constructing the assembly, or when opening and closing the panels. Moreover, to have to fit end connectors to the ends of the panels and a different tie or connector to the adjacent edges of the upper and lower panels is time consuming. Unless a plurality of ties/connectors are fitted at regularly spaced intervals used along the length of the adjacent edges of the upper and lower panels, the resulting door does not open and close easily and a person's hand can easily become caught between the panels when having to open and close a number of cages in a battery at speed.

It is an aim of the invention to provide a poultry cage door connector which can be used to connect the ends of two door panels forming a door, as well as adjacent edges of the door panels, which is quick and easy to attach and which provides a robust connection of the panels.

It is further aim of the invention to provide a poultry housing system in which the door of the housing is provided with a door connector which overcomes the aforementioned short comings of the prior art.

OVERVIEW OF THE INVENTION

According to the invention, there is provided a cage connector for connecting two mesh panels of a poultry cage wherein said connector comprises two generally elongated members which are hingedly connected together and which are releasably fastenable to each other, so that mesh parts from each panel are connected by placing the parts between the members and fastening the members to each other, wherein at least one member has a tab which projects transversely to the longitudinal axis of the member.

In this way, the connectors are quick and easy to fit to the cages during construction since they are placed over one or more wires of each mesh panel and the members are releasably secured together to surround the wires. The tab serves as a stop means to abut with another part of the cage to prevent movement of the panels.

The at least one tab preferably projects in the same plane as the member, or a plane parallel to the member.

Preferably, the members are hingedly connected by a resilient material.

Preferably, the cage connector comprises a plastics material.

The cage connector is preferably used to connect two mesh panels to form a cage door. When the cage door is closed, it lies in a substantially vertical plane and the tab of the connector abuts with a pillar of the cage to prevent the door being opened from within the cage.

Preferably each member is provided with at least two grooves to receive at least one mesh part from each panel when fitted to the cage.

More preferably, each member is provided with three grooves. In this way two wires from one panel and one wire from the other panel can be secured within the connector to provide an optimal pivoting action when the panels are moved relative to each other to open and close the door.

More preferably still, one groove is narrower that the other two grooves. This restricts movement of one wire within the connector and further assists with relative movement between the panels when the door is opened and closed.

According to a further aspect of the invention there is provided a cage system for housing an animal having an opening for entry and exit from the cage, said opening defined by a frame having two opposing vertical pillars and said opening provided with a door wherein the door comprises at least two mesh panels which each extend across the opening between the vertical pillars, said panels forming a surface having a vertical plane covering at least part of the opening when the door is closed and which are moved into a horizontal plane when the door is opened, characterised in that the two panels are connected by a cage connector and the tab of the connector abuts with a vertical pillar when the door is closed to prevent opening of the door by a mesh panel being pushed outwards from inside the cage.

A cage fitted with the connector has the advantage that the tab provides a stop means which abuts with a pillar of the cage to prevent the door being pushed open by an animal from inside the cage.

Preferably, the connector connects a horizontal wire of the mesh of each panel.

More preferably, the connector is positioned in a plane parallel to the plane of the panels.

Preferably, the connector is located at an end of the panels. A connector fitted at an end of the panels enables the projecting tab to abut with a cage pillar.

A further connector may be located between the ends of the panel. Since the connector is fitted by enveloping wires of the panels between the elongated members, one or more connectors can be easily fitted between two end connectors to give stability to the door.

The door of the cage may be manually opened from outside the cage by pushing inwards on one of the panels.

BRIEF DESCRIPTION OF THE DRAWINGS

The invention will now be described, by example only, with reference to the following drawings in which:

FIGS. 1b and 1c show in detail the prior art of the door of cage of FIG. 1a,

FIGS. 3a and 3b show the cage door fitted with the device in accordance with the invention.

FIG. 1a shows a cuboid cage of the type used in a poultry housing system.

DETAILED DESCRIPTION OF THE INVENTION

Figure 1A:
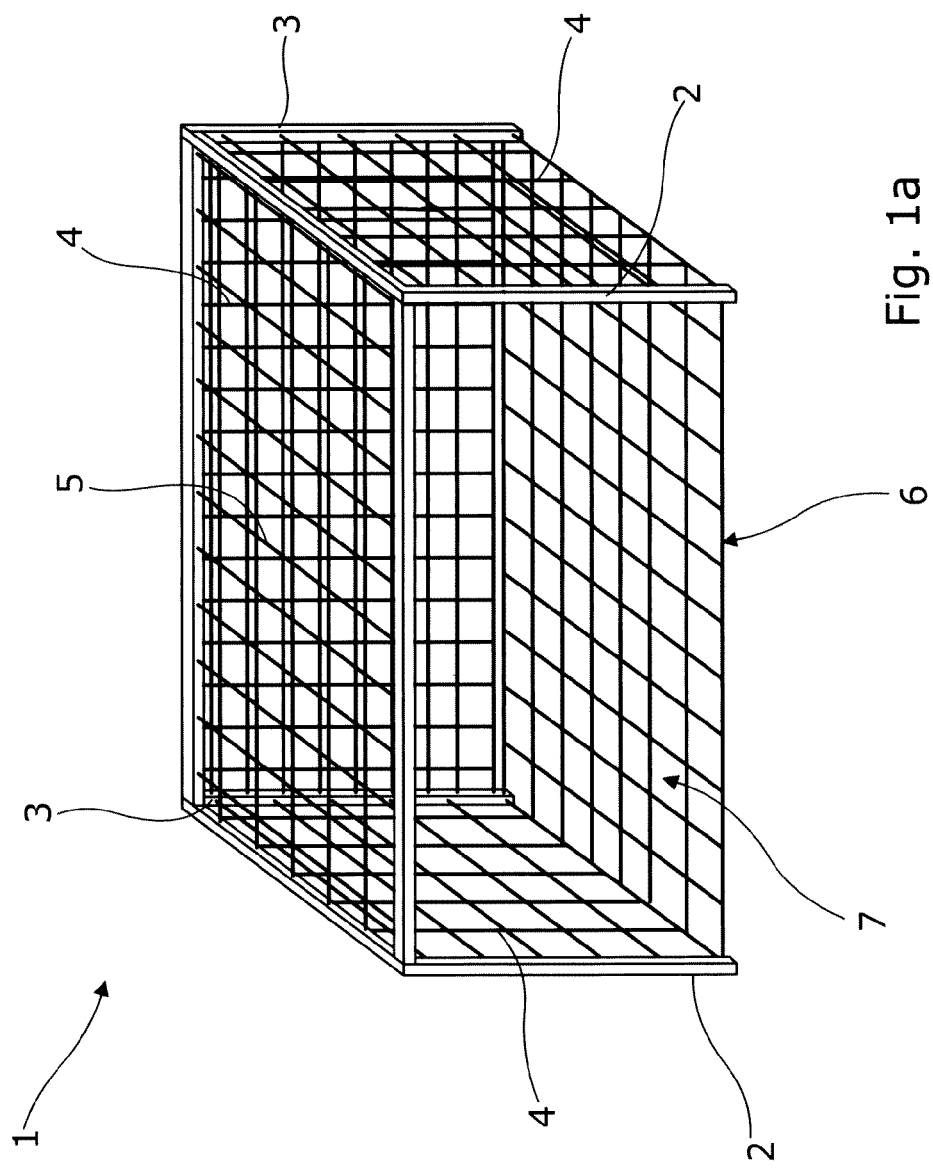
FIG. 1a shows a cuboid cage of the type used for housing poultry.

FIG. 1a shows a cage 1 which is used in a poultry housing system. Such a poultry housing system will comprise a plurality of cages which are stacked on top of and adjacent to one another in tiers within a battery. The cage 1 is of a cuboid configuration having mesh walls 4, a mesh roof 5 and a mesh floor 6 which are connected to each other and to four vertical pillars, two front pillars 2 and two rear pillars 3.

An opening 7 is placed in one of the sides is defined between the two front pillars 2 and an edge of the floor 6 and an edge of the roof 5. The opening 7 at the front of the cage is provided with a mesh door 8 (see FIG. 1b) which is opened and closed manually so that when the door is closed the poultry are contained within a cage and cannot wander through opening 7.

Figure 1B:
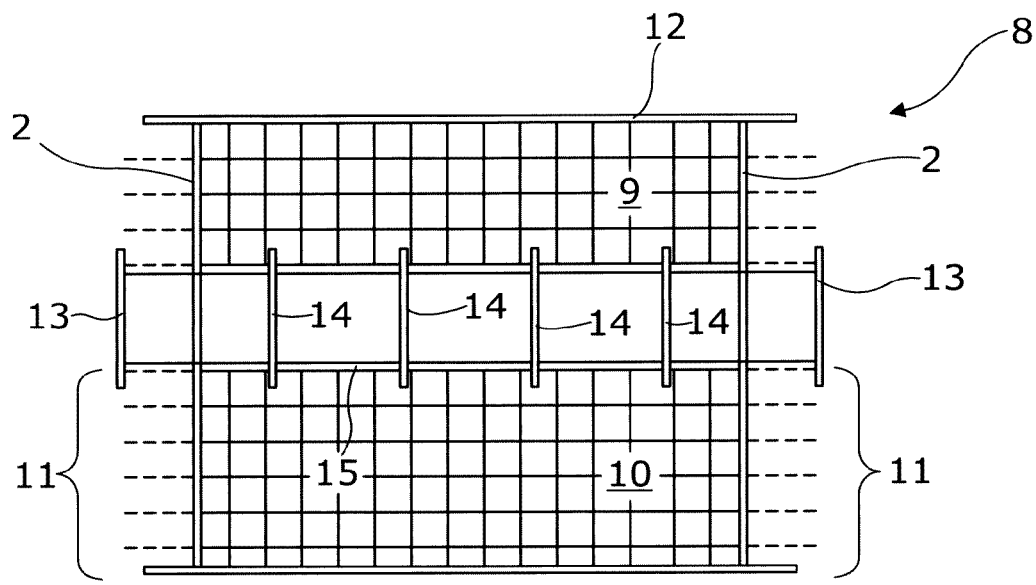

FIG. 1b is a front view of the door 8 which is fitted to the opening 7 between front pillars 2. Door 8 comprises two mesh panels, an upper panel 9 and a lower panel 10 which extend across the cage opening 7 between front pillars 2. In this drawing, pillars 2 have been drawn narrow to show that the horizontal wires 11 of the panels are exposed and unbordered. Usually, the ends of these horizontal wires 11 (shown by dotted lines) are not visible from the front since they are hidden from view by the front pillars 2.

Edge 12 of panel 9 is pivotally attach to roof 5 (not shown) and lower panel 10 is suspended from upper panel 9 by two end connectors 13 and ties 14. When the door is in a closed position, the two panels 9, 10 are aligned in a generally vertical plane covering most of the surface area of the opening 7. In an open position, the top panel 9 is pivoted inwards about the connecting edge 12 with the roof 5 into a substantially horizontal plane and the edge 15 of the lower panel 10 which is adjacent and connected to the upper panel 9 moves inwards to also move the lower panel 10 into a substantially horizontal plane. The exposed horizontal wires 11 abut and run along the inside of front pillars 2 when the door is opened and closed. The exposed wires 11 butting the inside of the front pillars 2 prevent the door 8 being pushed open from inside the cage by the poultry when it is closed.

Figure 1C:
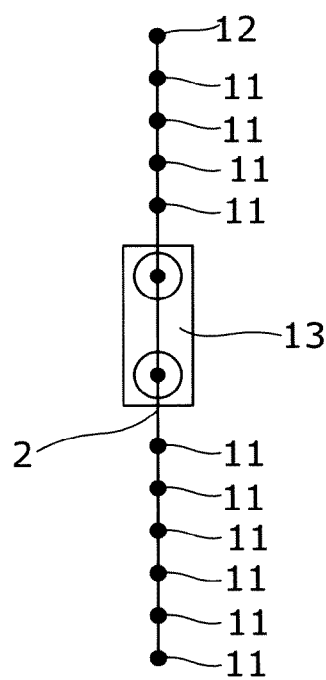

End connector 13 is shown in more detail in FIG. 1c which is an end view of FIG. 1b looking towards end connector 13. End connector 13 is a longitudinal part having a flat surface and is provided with a plurality of apertures 14 to slide onto a horizontal wire 11 of each panel. Connector 13 is held in place using washers. It is fitted so that the plane of the connector 13 lies substantially at right angles to the planes of the surfaces of the panels 9,10 when in both the open and closed positions.

Ties 14 are additionally needed along the length of adjacent panel edges to give the door stability. The ties 14 must take a different form than the end connectors 13, as end connectors 13 cannot be fitted to the closed mesh. Ties 14 are typically rigid plastic "C" shaped clips. They have the disadvantage that they permit movement of the wires within the clip which can lead to undesired movement between the connected panels. Having more than one type of connector to connect upper and lower panels increases the time required to construct the door. Moreover, the exposed horizontal wires 11 may cause injury to the poultry or human when opening and closing the door since the structure is not very robust. There is also a danger that a person opening and closing the door 8 will get a hand stuck between panels 9, 10 if there are insufficient ties 14 along the edges of adjacent edges of the panels.

Figure 2:
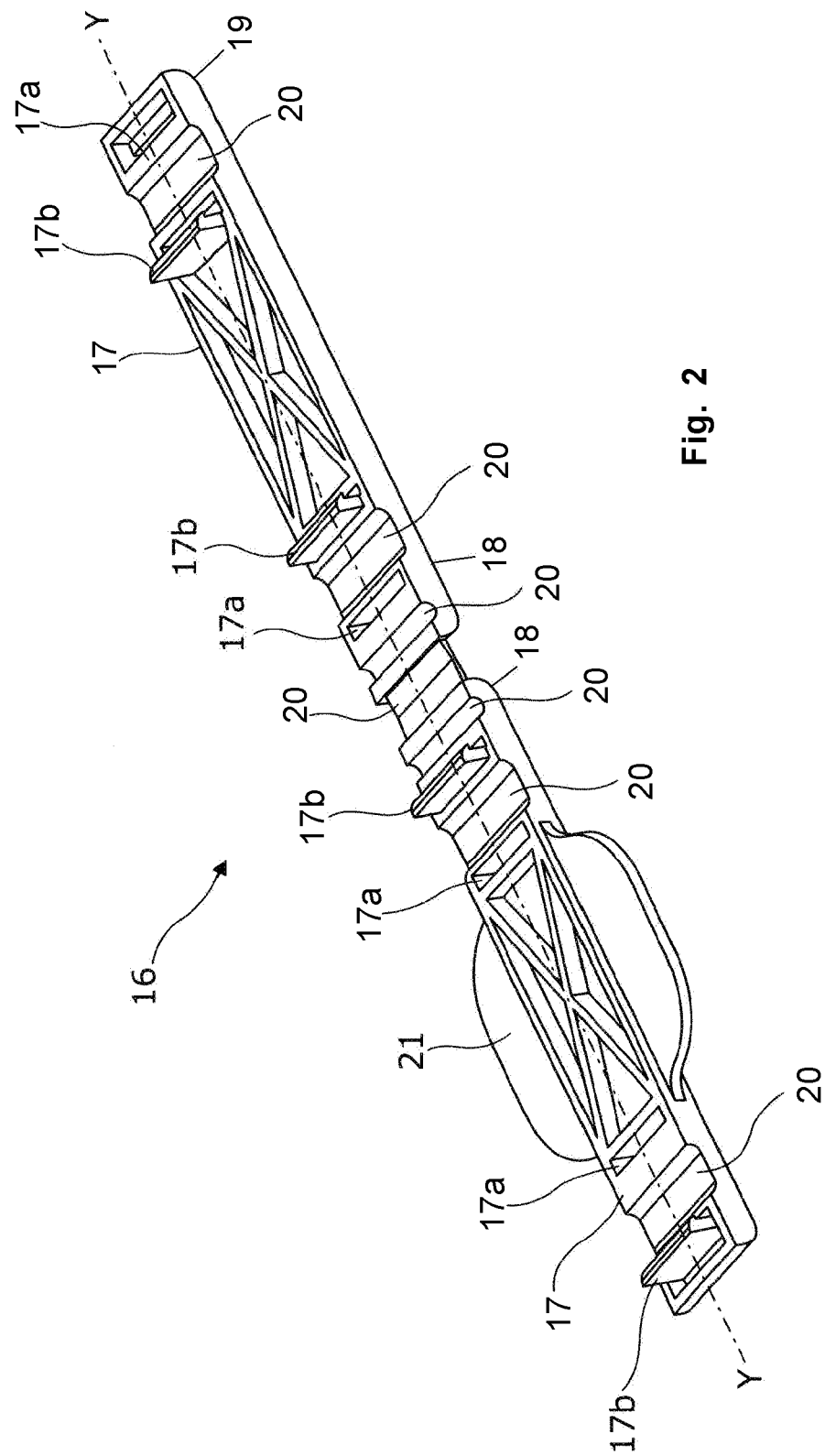
FIG. 2 shows a cage door connector in accordance with the invention.

FIG. 2 shows a cage connector 16 in accordance with the invention in which the connector is in an open position. Cage connector 16 comprises two generally elongate members 17 each having a hinge end 18 and a free end 19. The connector 16 has a longitudinal axis as shown by the dotted line Y-Y. Hinge ends 18 are connected by a resilient part to form a hinge connection 20. Members 17 are releasably fastenable to each other by corresponding mating parts comprising four slots 17a which receive corresponding hooks or teeth 17b. In FIG. 2, each member 17 is provided with two hooks or teeth 17b and two slots 17a. At least one of the elongate members 17 has a tab 21 which projects transversely to the longitudinal axis of the member 17. Tab 21 lies in the same plane as the elongate member 17 and may project from both sides of the longitudinal axis as shown in FIG. 2, or may just project out from one side of the longitudinal axis.

As can be seen in FIG. 2, each member 17 is provided with three correspondingly positioned grooves 20. When the connector 16 is closed by folding it about the hinge connection 20 and securing it by the mating parts 17a, 17b, the grooves 20 form three discrete enclosed wire holders which encase three wires from the two panels which are to be connected. To connect upper panel 9 to lower panel 10, one horizontal wire from panel 9 and two horizontal wires from panel 10 are placed within the grooves 20 and mating parts 17a, 17b are connected so that the wires of each panel are bound within the connector 16.

The pair of grooves which encase the wire from the top panel 9 are narrower than the two grooves which encase the wires from the lower panel 10. When fitted to the cage, the connector 16 pivots about the wire from the top panel 9. The two pairs of grooves which encase two wires from the lower panel 10 are wider and this allows greater movement of the wires within these grooves. This assists the smooth movement of the lower panel 10 when it is folded between closed and open positions.

Figure 3B:
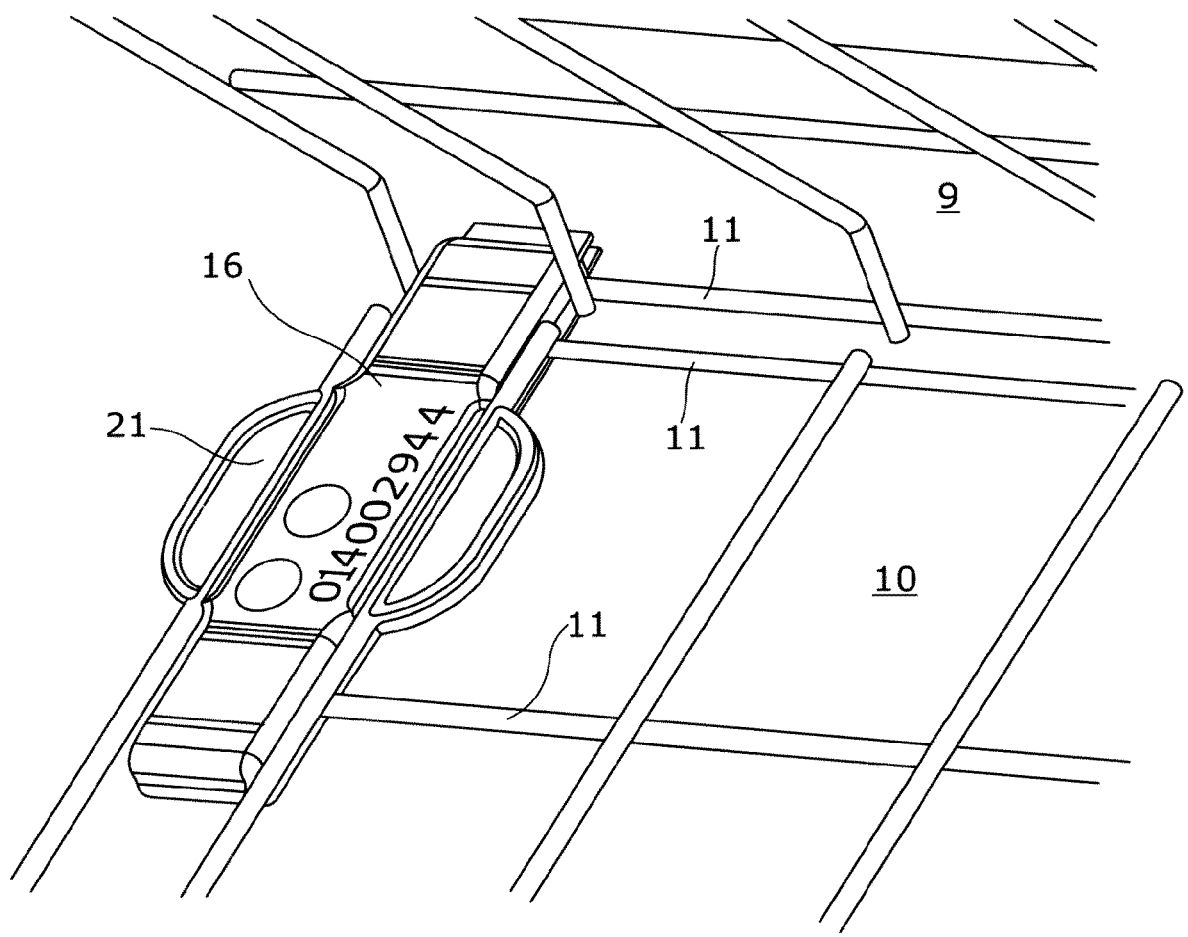

Tab 21 extends between the grooves which receive wires of the lower panel 10. FIGS. 3a and 3b show a front view of door 8 fitted with cage connectors 16 in accordance with a further aspect of the invention. FIG. 3a shows a cage door 8 fitted with three cage connectors 16 when the door is in a closed position. FIG. 3b is a close up view showing the door of FIG. 3a in an open position. In FIG. 3a two connectors 16 are located at towards the ends of the panels 9, 10 and one inbetween. The elongated members 17 of connector 16 have been placed over horizontal wires 11 from each panel 9, 10 and the members 17 fastened together.

The tabs 21 of the connectors 16 positioned towards each end of the panels 9,10 extend beyond the edges of the panels 9,10 to abut with the inside of the front pillars 2. In this way, tabs 21 provide the abutment means to prevent the door 8 being pushed open by poultry from inside the cage. As a result, the panels 9,10 do not have to be as wide as the opening 7 which is an improvement of the prior art. Provided a gap between the end of the panels 9, 10 and the front pillars 2 is not large enough for poultry to escape and the tab 21 is long enough to abut with a front pillar 2, then the panels 9, 10 can be smaller which therefore has cost saving implications. Since the connector 16 is fitted around horizontal wires 11 of the panels 9,10 and lies in substantially the same plane as the panels 9,10, the ends of the panels 9, 10 can be provided with a border/frame so that the horizontal wires 11 are not exposed. This prevents the likelihood of injury.

As a result fewer connectors along adjacent edges of the panels 9,10 are required than with the prior art. Since the same connector 16 can be used for all connecting positions of the panels, assembly of a door 8 is quicker and simpler than the prior art.

The invention claimed is:

1. A cage system for animal housing having an opening for entry and exit from the cage system, said opening defined by a frame having two opposing vertical pillars and said opening comprising a door wherein the door comprises at least two mesh panels which extend across the opening between the vertical pillars, said panels forming a surface having a vertical plane covering at least part of the opening when the door is in a closed position and which are moved into a horizontal plane when the door is in an opened position, wherein the at least two panels are connected by a cage connector, wherein said connector comprises:
two elongated members which are hingedly connected and releasably fastenable to each other, so that mesh parts from each panel are connected by placing the parts between the members and fastening the members to each other, wherein at least one member has a tab which projects transversely to the longitudinal axis of the member; and
wherein the tab of the cage connector abuts at least one vertical pillar when the door is in the closed position to prevent opening of the door by a panel being pushed outwards from inside the cage system.

2. The cage system as claimed in claim 1 wherein the at least one tab projects in the same plane as the member, or a plane parallel to the member.

3. The cage system as claimed in claim 1 wherein the members are hingedly connected by a resilient material.

4. The cage system as claimed in claim 1 wherein the cage connector comprises a plastics material.

5. The cage system as claimed in claim 1 wherein the cage connector is used to connect two mesh panels to form a cage door.

6. The cage system as claimed in claim 1 wherein each member comprises at least two grooves to receive at least one mesh part from each panel when fitted to the cage.

7. The cage system as claimed in claim 6 wherein each member comprises three grooves.

8. The cage system as claimed in claim 7 wherein one groove is narrower that the other two grooves.

9. The cage system as claimed in claim 1 wherein the cage connector connects a horizontal wire of the mesh of each panel.

10. The cage system as claimed in claim 1 wherein when the door is in the closed position, the cage connector is positioned in a plane parallel to the plane of the panels.

11. The cage system as claimed in claim 1 wherein the connector is located at an end of the panels.

12. The cage system as claimed in claim 11 wherein a further connector is located between the ends of the panels.

13. The cage system as claimed in claim 1 wherein the door is manually opened from outside the cage by pushing inwards on one of the panels.

* * * * *